US012806828B2

(12) United States Patent
Santos Barros et al.

(10) Patent No.: US 12,806,828 B2
(45) Date of Patent: Nov. 24, 2026

(54) METHOD FOR PRODUCING COMPONENTS FROM POLYURETHANE IN A SHOT METHOD

(71) Applicant: HENNECKE GMBH, Sankt Augustin (DE)

(72) Inventors: Tobias Santos Barros, Euskirchen (DE); Lars Etschenberg, Siegburg (DE)

(73) Assignee: HENNECKE GMBH, Sankt Augustin (DE)

( * ) Notice: Subject to any disclaimer, the term of this patent is extended or adjusted under 35 U.S.C. 154(b) by 17 days.

(21) Appl. No.: 19/114,971

(22) PCT Filed: Aug. 5, 2023

(86) PCT No.: PCT/EP2023/071751
§ 371 (c)(1),
(2) Date: Mar. 25, 2025

(87) PCT Pub. No.: WO2024/074235
PCT Pub. Date: Apr. 11, 2024

(65) Prior Publication Data
US 2026/0102952 A1 Apr. 16, 2026

(30) Foreign Application Priority Data
Oct. 4, 2022 (DE) ..................... 10 2022 125 452.6

(51) Int. Cl.
*B29C 45/02* (2006.01)
*B29C 45/18* (2006.01)
(Continued)

(52) U.S. Cl.
CPC .............. *B29C 45/02* (2013.01); *B29C 45/18* (2013.01); *B29C 45/46* (2013.01); *B29C 45/76* (2013.01); *B29K 2075/00* (2013.01)

(58) Field of Classification Search
None
See application file for complete search history.

(56) References Cited

U.S. PATENT DOCUMENTS 4,070,008 A 1/1978 Schlieckmann
4,944,599 A 7/1990 Soechtig
(Continued)

FOREIGN PATENT DOCUMENTS

DE 2607641 A1 9/1977
DE 3427326 A1 2/1985
(Continued)

OTHER PUBLICATIONS

International Search Report of PCT/EP2023/071751 Dated May 8, 2024, 4 Pages.
(Continued)

*Primary Examiner* — Virak Nguon
(74) *Attorney, Agent, or Firm* — LUCAS & MERCANTI, LLP; Klaus P. Stoffel

(57) ABSTRACT

A method for producing components from polyurethane in a shot method, having the steps: a) determining actual shot start by evaluating the profile of the respective pressure of the reaction component after generation of an electric signal at shot start, and determining the time at which the reaction component enters the mixing chamber of the mixing head and storing the time of the actual shot time, b) determining actual shot end by evaluating the profile of the respective pressure of the reaction component after generating an electrical signal at shot end, and determining the time at which the reaction component no longer enters the mixing chamber of the mixing head and storing the time of the actual shot end, c) determining the conveyed volume of the reaction component by the volume flow counter of the
(Continued)

respective reaction component, which volume was conveyed from the dosing pump between shot start and shot end.

10 Claims, 6 Drawing Sheets

(51) Int. Cl.

| | |
|---|---|
| ***B29C 45/46*** | (2006.01) |
| ***B29C 45/76*** | (2006.01) |
| ***B29K 75/00*** | (2006.01) |

(56) References Cited

U.S. PATENT DOCUMENTS

| | | | | |
|---|---|---|---|---|
| 6,261,486 | B1 | 7/2001 | Sulzbach | |
| 8,709,313 | B2 | 4/2014 | Fiorentini | |
| 2004/0217513 | A1* | 11/2004 | Wirth | B29B 7/7615 264/240 |
| 2021/0308906 | A1 | 10/2021 | Volpato | |
| 2022/0034788 | A1 | 2/2022 | Nygaard | |

FOREIGN PATENT DOCUMENTS

| | | | |
|---|---|---|---|
| EP | 0976514 | A1 | 2/2000 |
| EP | 1447206 | A1 | 8/2004 |

OTHER PUBLICATIONS

Wikipedia. “Ovalrad-Durchflussmesser” Aug. 14, 2020 (Aug. 14, 2020). pp. 1-3. Retrieved from the Internet: https://de.wikipedia.org/wiki/Ovalrad-Durchflussme sser [retrieved on Sep. 13, 2023] XP002810112.

Kunststofftechnik Ing. E. Gollus & Sohn GmbH [DE]. “Zahnrad-Durchfluss-Messturbine für viskose Flüssigkeiten” Jan. 17, 2021 (Jan. 17, 2021). pp. 1-3. Retrieved from the Internet: http://web.archive.org/web/20210117082210/ https://www.engolit.de/pdfs/Zahnrad-Durchfluss-Mess turbine _(Engolit). pdf [retrieved on Sep. 13, 2023] XP002810113.

* cited by examiner

METHOD FOR PRODUCING COMPONENTS FROM POLYURETHANE IN A SHOT METHOD

CROSS-REFERENCE TO RELATED APPLICATIONS

The present application is a 371 of International application PCT/EP2023/071751, filed Aug. 5, 2023, which claims priority of DE 10 2022 125 452.6 filed Oct. 4, 2022, the priority of these applications is hereby claimed and the applications are incorporated herein by reference.

BACKGROUND OF THE INVENTION

The invention relates to a method for the production of polyurethane components by the shot method, in which at least two reaction components are conveyed into a groove-controlled mixing head by means of metering pumps, in particular at metering pressures of at least 50 bar, wherein the reaction components are first conveyed in circulation through a respective component nozzle via a recirculation groove in a control slide in circulation back into a storage container, wherein the shot start is initiated by an electrical signal emitted by a machine control, as a result of which a hydraulic valve is switched and the control slide then moves from the circulation position into the shot position, so that the reaction components are entered into the mixing chamber, where they are mixed together and then discharged, wherein the shot end is then initiated by removing the electrical signal issued by the machine control, as a result of which the hydraulic valve is switched again and the control slide then moves from the shot position back into the circulation position, so that the reaction components are conveyed back again into the container via the recirculation groove in the control slide in circulation, wherein the media flows are briefly interrupted by the mixing head while the metering pumps are running when the control slide is moved from the circulation position to the shot position and vice versa, wherein the conveyed volume flows between the metering pump and the mixing head are each conveyed through a volume flow meter, which consists of at least one housing with an inlet opening and an outlet opening and at least two rotatably mounted bodies, in particular gear wheels, co-operating in this housing, wherein these rotatably mounted bodies are set in rotation in response to a volume flow conveyed by the volume flow meter.

With regard to the state of the art, reference is made to EP 0 976 514 A1, which discloses a generic shot method. DE 103 00 101 A1 describes a groove-controlled mixing head. DE 26 07 641 A1 also describes a high-pressure mixing head that can be used for a generic process. Similar and further solutions are shown in DE 34 27 326 A1 and US 2022/0347888 A1.

Furthermore, generic EP 1 447 206 A1 shows a method in which a proximity switch built into the mixing head is used as an indication for switching from circulation mode to shot mode. A further similar method is disclosed in US 2021/0308906 A1. Flow measuring elements are described, for example, in the Wikipedia article 'Oval Wheel Flow Meter' (https://de.wikipedia.org/wiki/Ovalrad-Durchflussmesser) and in the brochure "Zahnrad-Durchfluss-Messturbine für viskose Flüssigkeiten" from Kunststofftechnik Ing. E. Gollus & Sohn GmbH.

In dosing systems for processing polyurethane in shot operation, at least two reactive components are metered in a mixing head via nozzles at high speed into a mixing chamber, where they are then mixed and subsequently discharged into a mold, for example.

For a flawless component, it is crucial that the two reactive components are fed into the mixing chamber in the correct mixing ratio throughout the entire shot. A shift in the mixing ratio will affect the physical properties and therefore adversely affect the quality of the component.

The shot weight is also an important parameter that must be reproducibly maintained in order to obtain a high-quality component. A shot weight that is too low, for example, can lead to defects in the component; but a shot weight that is too high can also have a negative impact on the component properties.

It is therefore important for the manufacturer of molded parts that the mixing ratio is maintained as precisely as possible during the entire shot and that the measuring system used reliably detects a deviation in the mixing ratio during a shot so that the affected component can be sorted out or subjected to a more precise inspection. It is also important that the effective shot duration is correctly set and reproducibly maintained.

In order to ensure the correct mixing ratio at the start and end of the shot, the reactive components are ideally run through the mixing head at the same pressure ratios in circulation before and after the shot. In recirculation mode, the correct flow rates are set by the respective pumps in conjunction with the respective flow measurement so that the correct mixing ratio is set immediately at the start of the shot after switching from recirculation to shot mode.

As different molds are often fed with different flow rates from shot to shot on a polyurethane processing system, new flow rates may have to be set again and again within a short period of time between two shots. The faster the shot sequence, the more economically the system can be operated.

Until now, a characteristic curve has been stored in the control system at a certain pressure, which is used to determine the pump rotational speed for the required flow rate. This rotational speed is then set between two shots and the next shot is triggered. However, as the actual flow rate depends on the set pressures and also on the actual temperature (as this influences the media viscosity and also the density), this method is fast, but often does not meet the very high requirements for accuracy and reliability that are demanded in the automotive industry in particular.

Due to the rapid shot sequence, the flow measurement is often not fast enough or, if the measuring interval is too short, not precise enough to be able to set or adjust the flow rate exactly, regardless of the stored characteristic curve. A correspondingly fast and precise measuring method would be desirable in order to be able to readjust or adjust the flow rate as precisely as possible before each shot at the actual dosing pressure.

Due to these requirements, gear meters are generally used in the implementation of the generic method, as these can measure the volume flows relatively quickly and accurately (analogously, this also includes screw meters, which are also covered by the considerations below). Another advantage of gear meters is their relatively favorable price. However, especially with relatively small volume flows, where the gear wheels of the gear meter only rotate relatively slowly, gear meters also reach their limits in terms of measuring accuracy in combination with measuring speed.

In particular, it is then often no longer possible to regulate the dosing quantity quickly and accurately between two shots, meaning that you are dependent on the stored characteristic curve. At best, this characteristic curve can be dynamically adjusted based on the actual measured flow rates. However, regulation is often not possible with very short time intervals between two shots because the measuring instrument cannot measure quickly and accurately enough at the same time.

It is also impractical to regulate the volume flow during the shot in this way because the measurement is usually either too slow or too inaccurate to regulate the volume flow properly using the measurement signal.

Another problem is the exact evaluation and logging of the volume flows during a shot. It is a great advantage for the manufacturer if the volume flows are measured and logged as accurately as possible during the shot. This data is particularly important for efficient quality control. If deviations from the target state are reliably recorded, this data can be used to subject the affected components to a special test or to reject them if necessary.

Another technical problem is the exact determination of the start and end of the shot. The actual start of the shot is the time at which the control tappet clears the path into the mixing chamber. The shot release signal first switches the hydraulic valve, which then moves the control tappet. However, the material only flows into the mixing chamber once the control tappet has actually passed through the nozzle hole. It is therefore important to determine this time point precisely for accurate logging and optimization of the shot duration.

SUMMARY OF THE INVENTION

In the light of the situation described above, the present invention is based on the object of further developing a generic method in such a way that it is possible to make the most accurate statements possible about the quantity of reactive components used for a shot in order to produce components of the highest possible quality. An important aspect here is to record the actual start of the shot and the actual end of the shot as precisely as possible. Furthermore, it should be possible to use simple and inexpensive volume flow meters, in particular gearwheel meters, to record the actual volume conveyed during a shot as precisely as possible.

The solution of this problem by the invention is characterized in that the steps are provided in a generic method:

a) Determining the actual shot start by analyzing the course of the respective pressure of the reaction component after the electrical signal for the shot start has been generated and determining the time point at which the reaction component enters the mixing chamber of the mixing head and storing the time point of the actual shot start, b) Determining the actual shot end by analyzing the course of the respective pressure of the reaction component after the electrical signal for the shot end has been generated and determining the time point at which the reaction component no longer enters the mixing chamber of the mixing head and storing the time point of the actual shot end, c) Determining of the delivered volume of the reaction components by means of the volume flow meter of the respective reaction components, which was delivered by the metering pumps in the period between the time point of the actual shot start and the time point of the actual shot end and outputting the respectively determined volumes.

When carrying out the aforementioned steps a) and b), preferably the variation in time of the pressure of the respective reaction component is analyzed, wherein the maximum value of the pressure and/or a predetermined limit value for the pressure change over time being considered.

Specifically, it can be provided that when carrying out the above-mentioned step a), the maximum of an occurring pressure peak is determined for the purpose of determining the shot start and the time point of occurrence of the pressure peak is determined as the time of the actual shot start.

However, it can also be provided that when carrying out above step b), the increase in the pressure curve is determined for the purpose of determining the shot end and the time immediately before the increase in pressure is determined as the time of the actual shot end.

In the machine control preferably data for the density of the reaction components as a function of the pressure and of the temperature of the reaction component are stored, wherein the pressure of the reaction components between the time point of the shot start and the time point of the shot end, in particular the average pressure during the said times, and the temperature of the reaction components being measured and the actual density of the reaction components being determined therefrom. The volumes of the reaction components determined in above step c) and the determined actual densities of the reaction components are then preferably used to determine the conveyed mass of the reaction components. This makes it possible to determine the effective masses of the reaction components used during a shot.

The following method can be used to determine the conveyed volume in accordance with step c) above:

A) Calibration of the volume flow meter and define an error screen by:

A1): Determining of the conveyed volume for each co-operating pair of teeth of the rotatably mounted bodies;

A2): Forming the average value of the conveyed volume over all pairs of teeth;

A3): Determining of the deviation of the conveyed volume of each pair of teeth from the average value and storing the determined deviations;

B) In determining the volume conveyed during the time point of the actual shot start and the time point of the actual shot end according to above step c):

B1): Determination of the conveyed volume for all partial volumes of the tooth pairs used during the start and end of the shot, taking into account the deviations from the average value using the error screen;

B2): Summation of all partial volumes to obtain the total volume delivered between the start and end of the shot.

For the determination according to above step A1) preferably two sensors are used, which sensors detect the position of the tooth flanks or tooth heads of the rotatably mounted bodies and convert each into a square-wave signal, wherein the square-wave signal being used to detect the position of successive teeth of the rotatably mounted bodies. The two sensors are preferably arranged offset relative to one another in such a way that the position of the successive tooth flanks or tooth heads of the rotatably mounted bodies can be detected phase-shifted.

The calibration and setting of the error screen according to above step A) can be repeated periodically.

On the one hand, the proposed method therefore includes a special, very fast and precise measuring method in which commercially available gear or, if necessary, screw spindle counters can be used. In addition, the method includes a very precise method for detecting the actual start and end of the shot. The combination of these two features enables very precise process control during the shot on the one hand and very precise logging of the process during a shot on the other. This allows the reject rate to be reduced and the quality control process to be organized more efficiently. With the help of better logging of shot weight and volume flows during the shot (including a possible shift in the code number), potential reject components can be detected more reliably on the basis of the data and, if necessary, sorted out or subjected to a more detailed examination.

In this context, it should be mentioned that faults in the component are often caused by code number shifts or mixing faults at the start of the shot. Therefore, reliable and precise detection of the start of the shot in combination with exact volume flow measurement increases production reliability and, in particular, facilitates quality control for the manufacturer.

If the data is correlated with the actual rejected components over a longer period of time, quality control can also be automated if necessary. It is also possible to automatically adjust the machine parameters based on this data. Furthermore, this data can also be used to optimise the intervals for machine maintenance.

Detection of the start of the shot is based on the control slide passing through the nozzle bore at a finite speed. Normally, both the return line and the path into the mixing chamber are blocked for a short time. This causes the pressure in the media lines to rise briefly; this pressure increase can be used to detect the actual time at which the shot starts.

The difficulty in detecting the exact start of the shot is that the pressure curve in the media lines usually oscillates around a mean value. This is due to the fact that piston pumps are generally used a pumps. Each piston is filled once per revolution and expels the material once per revolution. This results in a high-frequency oscillation of the media pressure in the piping system.

If the pressure increase at the beginning of the shot does not significantly exceed the amplitude of these vibrations, it is difficult to detect the beginning of the shot only by applying a certain threshold as a criterion for the beginning of the shot. A preferred approach to solving this problem is explained below (statistical methods using the standard deviation).

The proposed method also allows the component flows to be regulated during a shot.

This is particularly interesting for applications in which molds with narrow cross-sections have to be filled, resulting in an increasing back pressure over the shot. This increasing back pressure can affect the dosing accuracy of the pumps. With the fast and precise control made possible by the proposed method, it is possible to maintain the required mixing ratio very precisely during the shot, even under changing conditions.

The efforts of the manufacturers of volumetric measuring instruments to increase the accuracy of the measuring instruments are primarily aimed at determining the position of the rotating measuring body as accurately as possible, at high resolution and at high speed. While this is certainly expedient, it overlooks an important aspect:

Gear meters are subject to manufacturing tolerances that are responsible for the fact that a rotation by a multiple of the mean angle between two adjacent teeth (360°/n; where n is the number of teeth) is not at all always caused by the same delivery volume.

This results in inaccuracies in the evaluation of particularly small measuring intervals, in which the rotating measuring body covers significantly less than a full revolution.

The proposed method also aims to evaluate the rotation of the rotating measuring body, which is reliably repeated periodically with each revolution but is quite noticeably uneven over one revolution, as accurately as possible at non-time-critical moments, and then to use this data to be able to measure as quickly and accurately as possible at time-critical moments (the "error screen" is used for this).

This, in combination with the determination of the exact start and end of the shot, leads to a very precise determination of the actual shot weights, especially if—as is preferred—a function for calculating the media densities as a function of pressure and temperature is also stored in the control system.

The volume flow meter continuously generates signals in response to the volume of fluid flowing through the flow meter. In moments when constant conditions prevail, these are evaluated so that a delivery characteristic applicable to these operating conditions can be derived. This delivery characteristic contains all the delivery volumes that have passed through the volume flow meter between two consecutive signals, wherein the signals being triggered by the respective sensor with repeatable accuracy at a specific position on one of the rotating measuring bodies.

The quotient of the time difference between two consecutive signals and the time required for a full rotation serves as a measure of the proportion of the volume conveyed during one full rotation that was conveyed between two defined consecutive signals. This allows n intervals to be defined over each revolution, where n is the number of teeth on the gear wheel of the volume flow meter. An interval characterizes an angular range in which the rotating measuring body is positioned between the triggering of two consecutive signals and, in particular, also a corresponding characteristic delivery volume that has caused the angular change.

For each revolution of the measuring sensor, n signals are generated, whereby the value for n is preferably at least 10. In a particularly preferred embodiment, at least 50 signals are generated per revolution. To determine the delivery characteristics, at least three full revolutions of the gear wheel meter are evaluated and the respective mean values are then calculated. In principle, this can be carried out and adjusted continuously as long as constant conditions prevail.

In a preferred embodiment, this delivery characteristic is continuously adapted. In this process, each cycle is given a weighting with which the signals of this cycle enter the delivery characteristic, depending on the magnitude of the fluctuation in the time differences between two consecutive signals within this cycle (or the delivery volumes derived from them).

In the time-critical moments, the delivery volume between any two signals can then be calculated with the help of this delivery characteristic, since the delivery volume was previously determined specifically for each interval.

In another preferred embodiment of the method, two sensors are provided in each gear wheel meter, wherein both the rising edge (which occurs when a tooth flank is located under the sensor or enters the measuring field of the sensor) and the falling edge (which occurs when a tooth flank exits the measuring field of the sensor) generate a signal. This means that each individual tooth generates a total of four signals per revolution, phase-shifted, which significantly increases the resolution.

A dynamic generation and adaptation of a data set can be provided, with the help of which a dosing volume that has been dosed in a particular interval can be assigned to any interval between any two signals generated by the volume flow meter. This data set can be generated by assigning a time stamp to each signal generated, while keeping the volume flow as constant as possible and under stationary conditions, whereby the cyclic repetition of the signals is detected by the control system and whereby the difference between two consecutive time stamps is evaluated as a measure of the volume dosed in this time interval and converted accordingly.

The actual shot start can be determined by analyzing and evaluating the course of the media pressures with regard to a sudden pressure increase after the electrical signal for the shot start has been generated, wherein statistical methods are used to determine whether the pressure fluctuations are normal or have been triggered by the control slide process.

The actual shot end can be determined by analyzing and evaluating the course of the media pressures with regard to a sudden pressure increase after the electrical signal has been generated to end the shot, wherein statistical methods are used to determine whether the pressure fluctuations are normal or have been triggered by the control slide process.

The respective data is stored.

Furthermore, the stored time stamps for the start and end of the shot can be synchronized with the signals from the volume flow meters, whereby the dynamically generated data record is then used to determine the volume dosed in the time interval between the start and end of the shot for each component.

With regard to determining the start of the shot, it is possible to provide that a sliding mean value is formed for the pressure curve within one of the reactive component media lines, with the difference between this sliding mean value and the current measured value or, alternatively, to a sliding mean value formed over a significantly shorter period of time, being continuously formed. The averaging can be done by software or hardware. The shot start can subsequently be detected on the basis of the variation over time of said difference.

With regard to determining the shot end, it can be provided that a sliding mean value is formed for the pressure curve within one of the reactive component media lines, with the difference of this sliding mean value to the current measured value or, alternatively, to a sliding mean value formed over a significantly shorter period of time, being continuously formed. The averaging can be done by software or hardware. The end of the shot can then be detected on the basis of the time course of said difference, whereby the signal to trigger the shot end can be used as a further necessary criterion.

The media densities can be stored in the control system in a manner dependent on both pressure and temperature, with the pressure and temperature of the reactive components being measured during each shot and the average media density during the shot being determined accordingly, so that the metering quantities can then be calculated and output by multiplying the metering volumes by the densities.

Two sensors can be used per volume flow meter to generate phase-shifted signals. This results in the aforementioned square-wave signal curve. Both the rising and falling edges of this curve can be evaluated.

The dynamically generated data set mentioned above can be continuously adjusted by first weighting each cycle according to the dispersion of the difference in the time stamps of two consecutive signals of the same type, where a cycle with a low dispersion receives a high weighting and a cycle with a high dispersion receives a low weighting.

The volume flows of the individual components can be set immediately before the start of the shot by controlling the pump speed depending on the deviation of the measured volume flows from the set volume flows. The speed of the metering pumps can be kept constant at the start of the shot.

The advantage is that the volume flow-specific line volume between the volume flow meter and the mixing head nozzle is small. The volume flow meter should therefore be located close to the mixing head nozzle.

Furthermore, it can be provided that the measured values of the volume flow measurement are also used in the exact determination of the shot start, whereby a sudden reduction of the volume flow is used as a criterion for the shot start.

BRIEF DESCRIPTION OF THE DRAWING

The drawings show an embodiment of the invention.

DETAILED DESCRIPTION OF THE INVENTION

Figure 1:
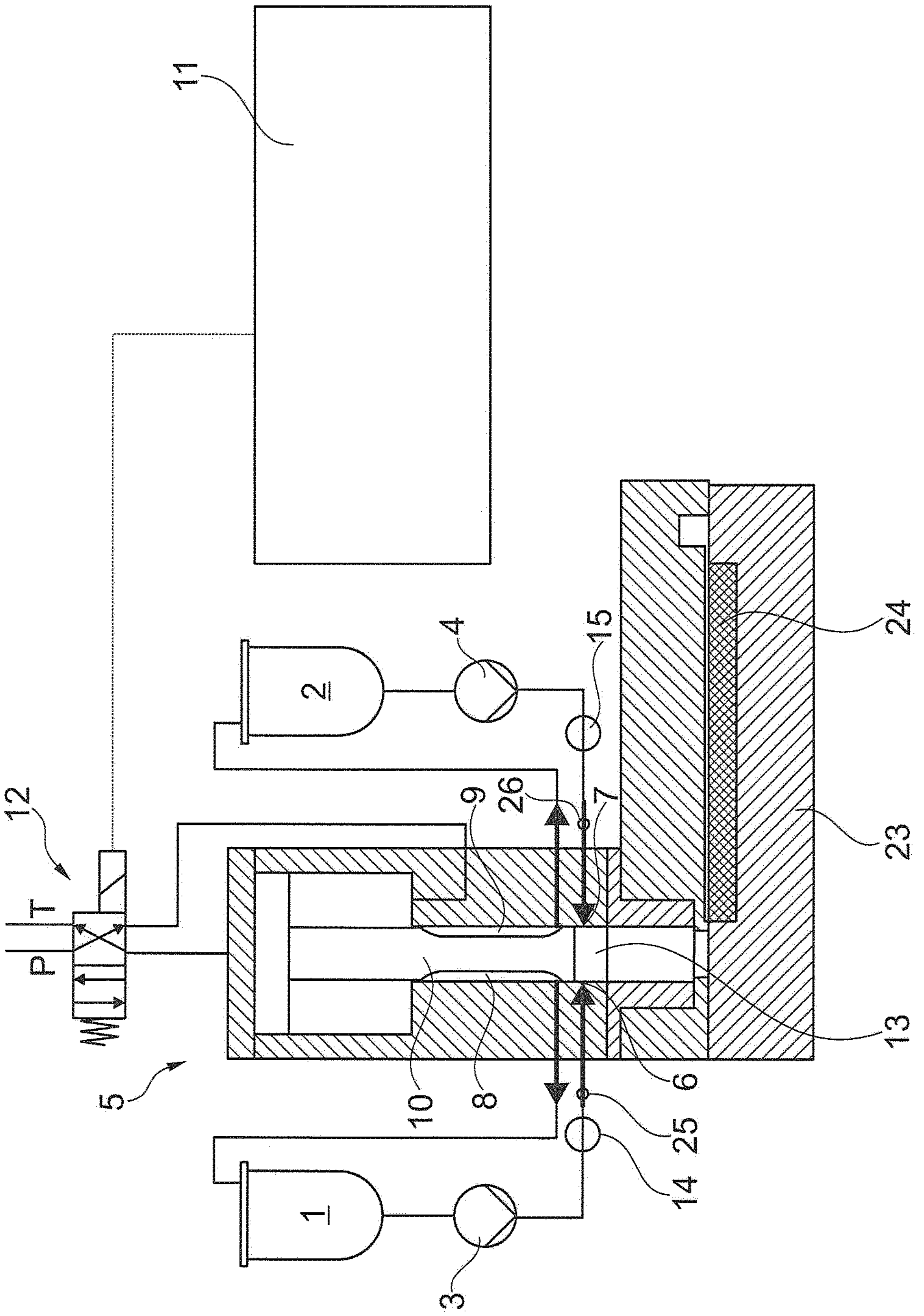
FIG. 1 schematically shows a groove-controlled mixing head that is fed with two reactive components (namely polyol and isocyanate), with the entry of the reactive components into the mixing chamber of the mixing head being illustrated.

FIG. 1 shows a mixing head 5, which is used to mix two reaction components 1 (polyol) and 2 (isocyanate) with each other to obtain polyurethane, which is injected into a tool 23, thereby producing a molded part 24. This is done in the known shot operation, for which EP 0 976 514 A1 was mentioned at the beginning.

The mixing head 5 is groove-controlled, i.e. it comprises an axially displaceable control slide 10, which is provided with recirculation grooves 8 and 9 for the two components 1, 2. The displacement of the control slide 10 is initiated by a machine control 11 via a hydraulic valve 12, which is controlled accordingly. Depending on the position of the control slide 10, the two reaction components 1 and 2 can either be circulated or injected into the mixing chamber 13 of the mixing head 5; the latter case is shown in FIG. 1. In this case, the two reaction components 1 and 2 are supplied to the mixing chamber 13 via metering pumps 3 and 4, the supplied volume being determined by volume flow meters 14 and 15. The two reaction components 1 and 2 enter the mixing chamber 13 via corresponding component nozzles 6 and 7.

It is essential that the exact mass of reaction components 1, 2 is determined, which is supplied to the mixing chamber 13 and from which the molded part 24 is formed. In this case, the position of the control slide 10 can be detected using a suitable sensor (mixing head initiator) when it comes to rest in the position in which reaction components 1, 2 are fed to the mixing chamber 13, in accordance with the state of the art. However, this has proved to be insufficient, so that, according to the present invention, the procedure is as illustrated in FIG. 2:

Pressure sensors 25 and 26 (see FIG. 1) are arranged close to the component nozzles 6 and 7, with which the pressure p of the respective reaction component 1, 2 can be detected. This pressure is shown schematically over time in FIG. 2 (for one of the reaction components). At a point in time $T_1$, the machine control 11 causes the valve 12 to be actuated, so that the control slide 10 is moved into the release position, in which the reaction components 1, 2 enter the mixing chamber 13. However, at this point in time $T_1$, no material flows yet. At a later point in time, $T_2$, a non-illustrated end position sensor (mixing head initiator) detects that the control slide 10 has reached the position in which the reaction components 1, 2 can enter the mixing chamber. However, material flows into the mixing chamber 13 before this, i.e. before the point in time $T_2$ is reached.

Figure 2:
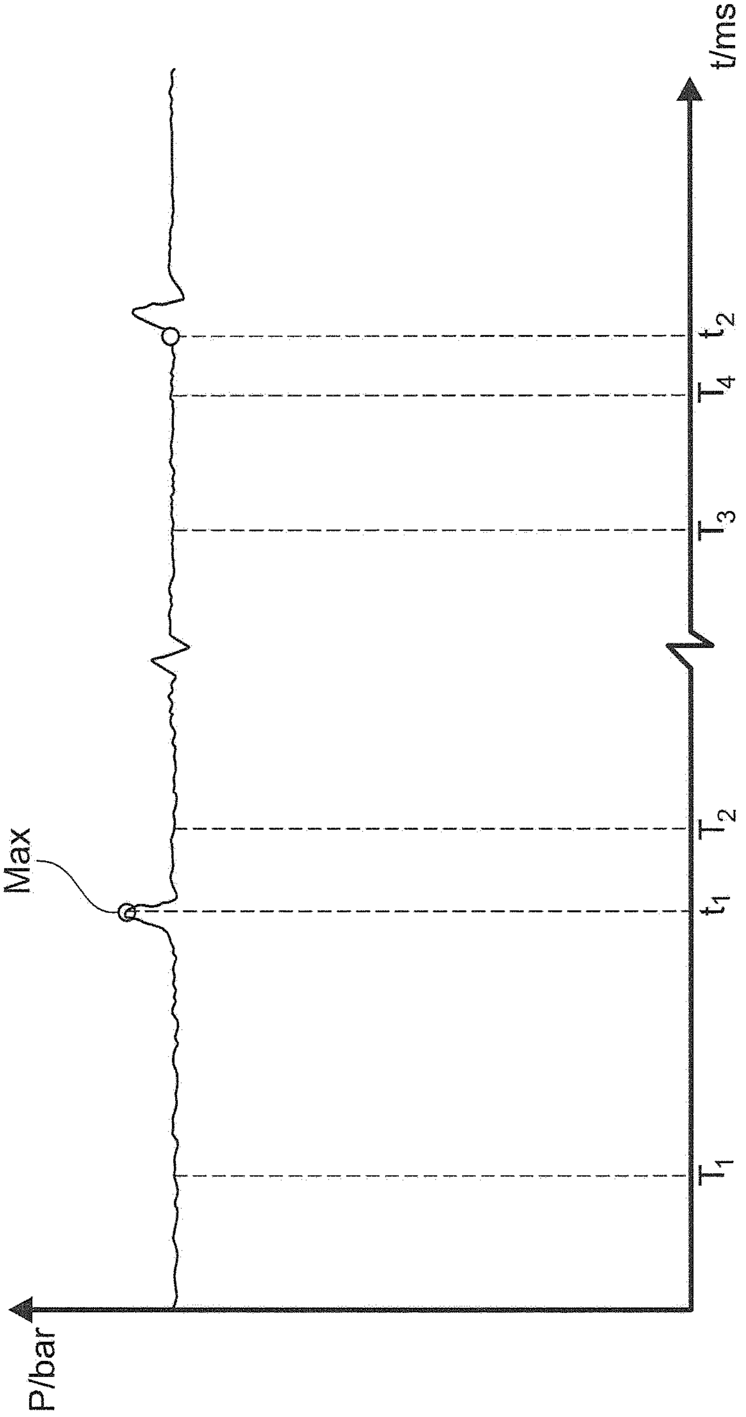
FIG. 2 shows the pressure curve over time for one of the reactive components, with the left-hand area showing the curve at the shot start and the right-hand area showing the curve at the shot end, FIG. 3 schematically shows a volume flow meter in the form of a gear wheel meter, which is equipped with two sensors arranged offset in the peripheral direction of one of the gear wheels for detecting the position of the teeth of the gear wheel, FIG. 4 schematically shows the signals detected by the two sensors, which are applied as rectangular signals over time, wherein the time intervals for corresponding flanks of the measured rectangular curve and the associated mean volume flows in the respective time interval are indicated, FIG. 5 schematically shows the pressure curve and the volume flow over time during a shot in the upper area and the corresponding curves of the recorded square-wave signals of the sensors and the assignment of the time for the start of the shot and for the end of the shot in the lower area and FIG. 6 schematically shows the principle of compensating for error deviations in the individual chamber volumes of the gear pairs of the gear meter by means of an error screen.

It is therefore suggested to monitor the pressure p over time and to determine when a "peak" occurs, as shown on the left side of FIG. 2, with the maximum being referred to as Max. This is the case at time $t_1$. The "peak" occurs as a result of the fact that, for a very short time during the switchover from recirculation mode to injection mode, the recirculation grooves shut off the flow path, so that when the metering pumps 3 and 4 are running, the pressure increases. The moment this pressure is reduced again, it is a sure indication that material is now entering the mixing chamber 13.

Consequently, by monitoring the pressure curve over time and determining the maximum Max, the correct time $t_1$ of the actual start of the shot can be determined.

The conditions that arise at the end of the shot are shown in the right half of FIG. 2. At time $T_3$, the machine control 11 gives the signal to the valve 12 to advance the control slide 10 and thus to switch from injection mode to recirculation mode. At this point, however, material is still flowing into the mixing chamber. This is still the case when point $T_4$ is reached, at which point the end position sensor detects that the control slide 10 has left its end position. Rather, the actual end of the shot is not reached until a later point in time $t_2$, which is noticeable in the pressure curve by a new "peak" caused by the same effect as at the start of the shot. Accordingly, the proposed further monitoring of the pressure p determines when the pressure rises, so that the exact point in time $t_2$ when the shot ends can be detected.

At both points in time $t_1$ and $t_2$, "time stamps" are set that are used to determine which volume was conveyed by metering pumps 2 and 3 between the two points in time, which is determined by volume flow meters 14 and 15.

Figure 3:
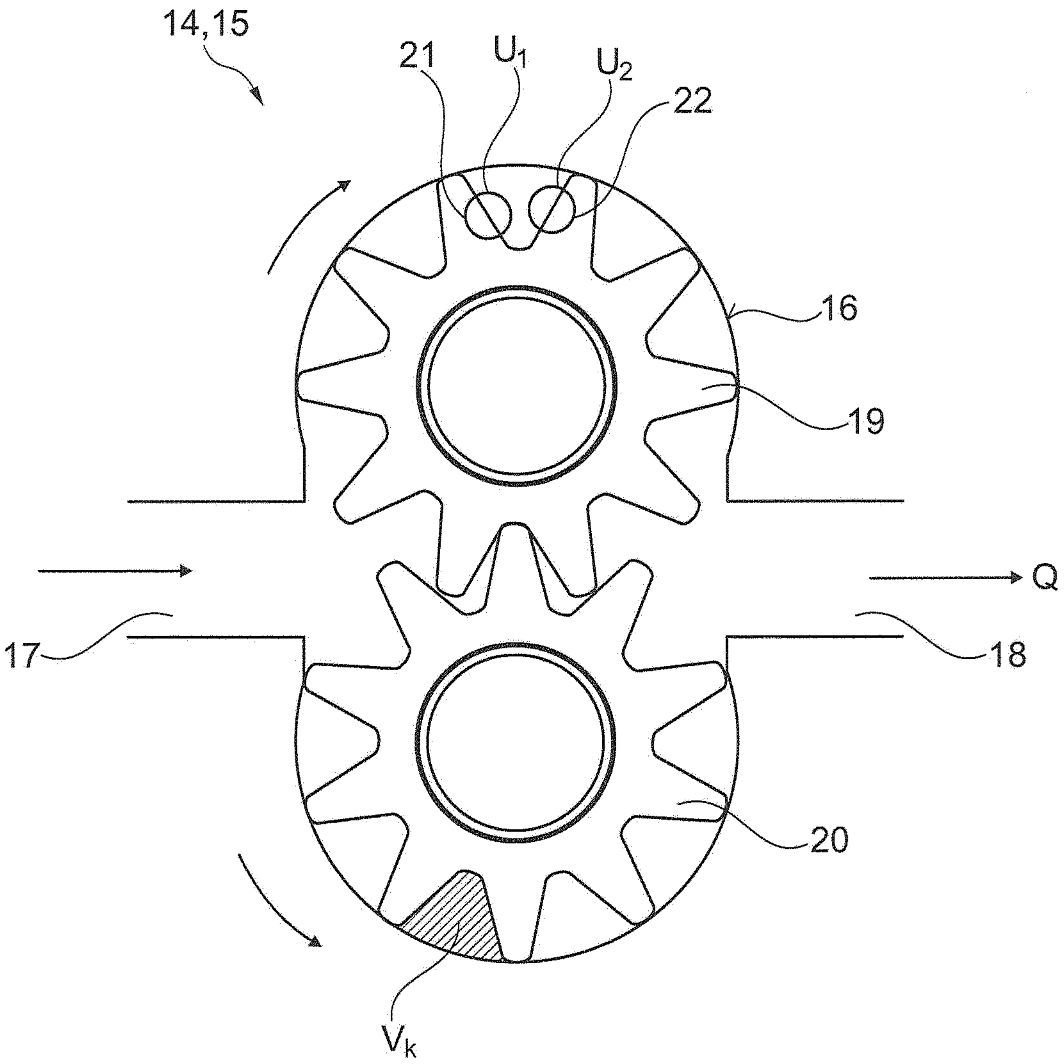

Insofar, reference is made to FIG. 3, where a volume flow meter 14, 15 is shown in schematic form. Two cooperating, rotatably mounted bodies in the form of two gear wheels 19 and 20 are arranged in a housing 16 with an inlet opening 17 and an outlet opening 18, and these gear wheels mesh with one another. When a volume flow Q enters the inlet opening 17, the gears 19, 20 rotate, which is used to measure the volume delivered. When the gears 19, 20 have turned one tooth further, a chamber volume $V_K$ has been delivered, which is determined for the volume flow meter. From this, the volume flow can then be determined as volume per time and, by integrating the volume flow over time, the total volume delivered.

Thus, by recording the volume flow through the volume flow meters 14, 15, it is possible to determine the volume that passed through the meters between the times $t_1$ and $t_2$, for which purpose the aforementioned "time stamps" for the times $t_1$ and $t_2$ are compared with the corresponding data recorded for the two volume flow meters 14, 15. From this, not only the total volume that entered the mixing chamber 13 for the two reaction components 1, 2 between the times $t_1$ and $t_2$ can be determined in the machine control, but also the corresponding mass of the two reaction components 1, 2 via the stored density of the two media (as a function of pressure and temperature).

One problem arises from the fact that commercially available volume flow meters, which are available at a sufficiently low price, only have limited accuracy due to manufacturing inaccuracies.

Figure 4:
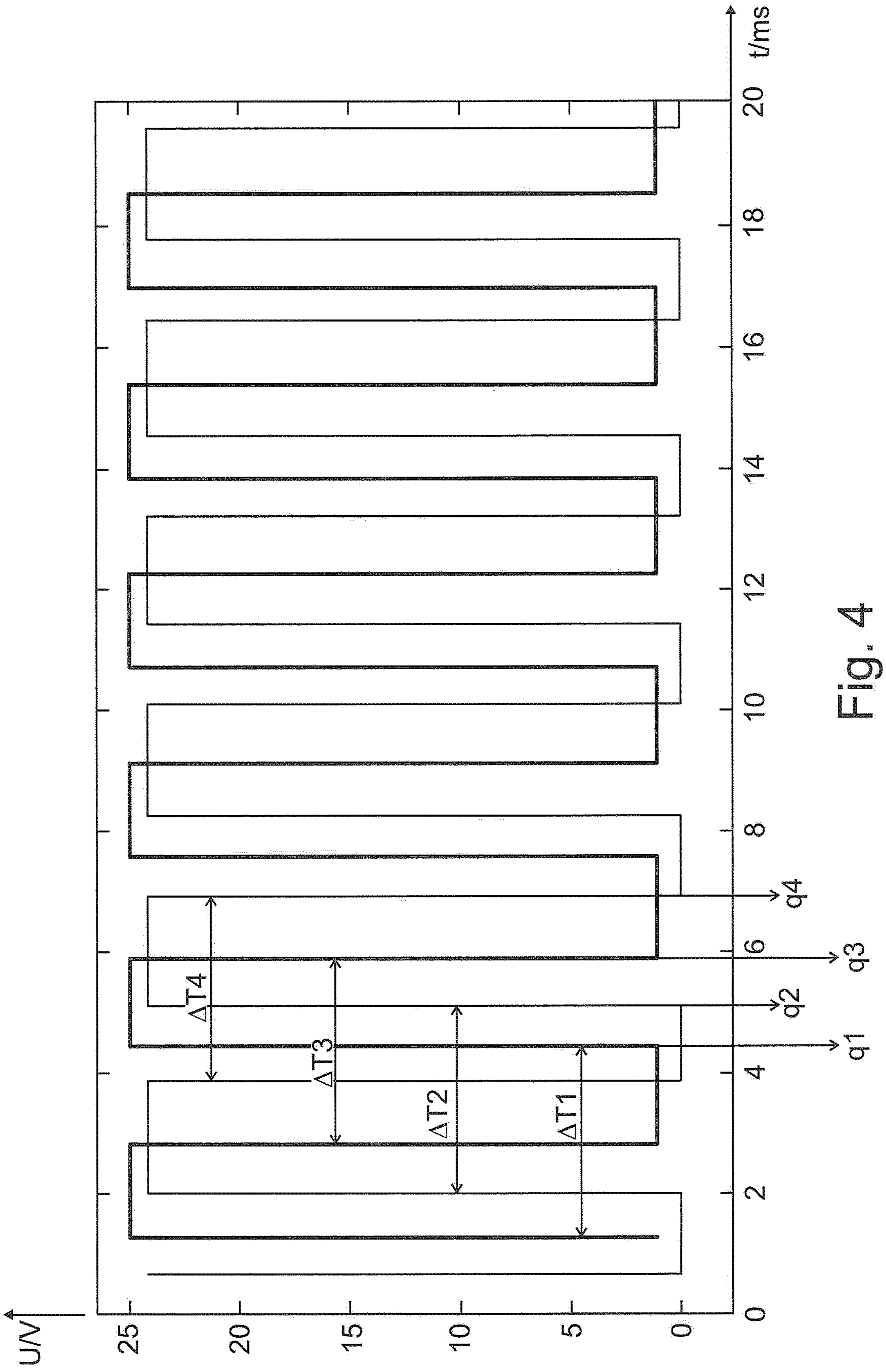
Figure 5:
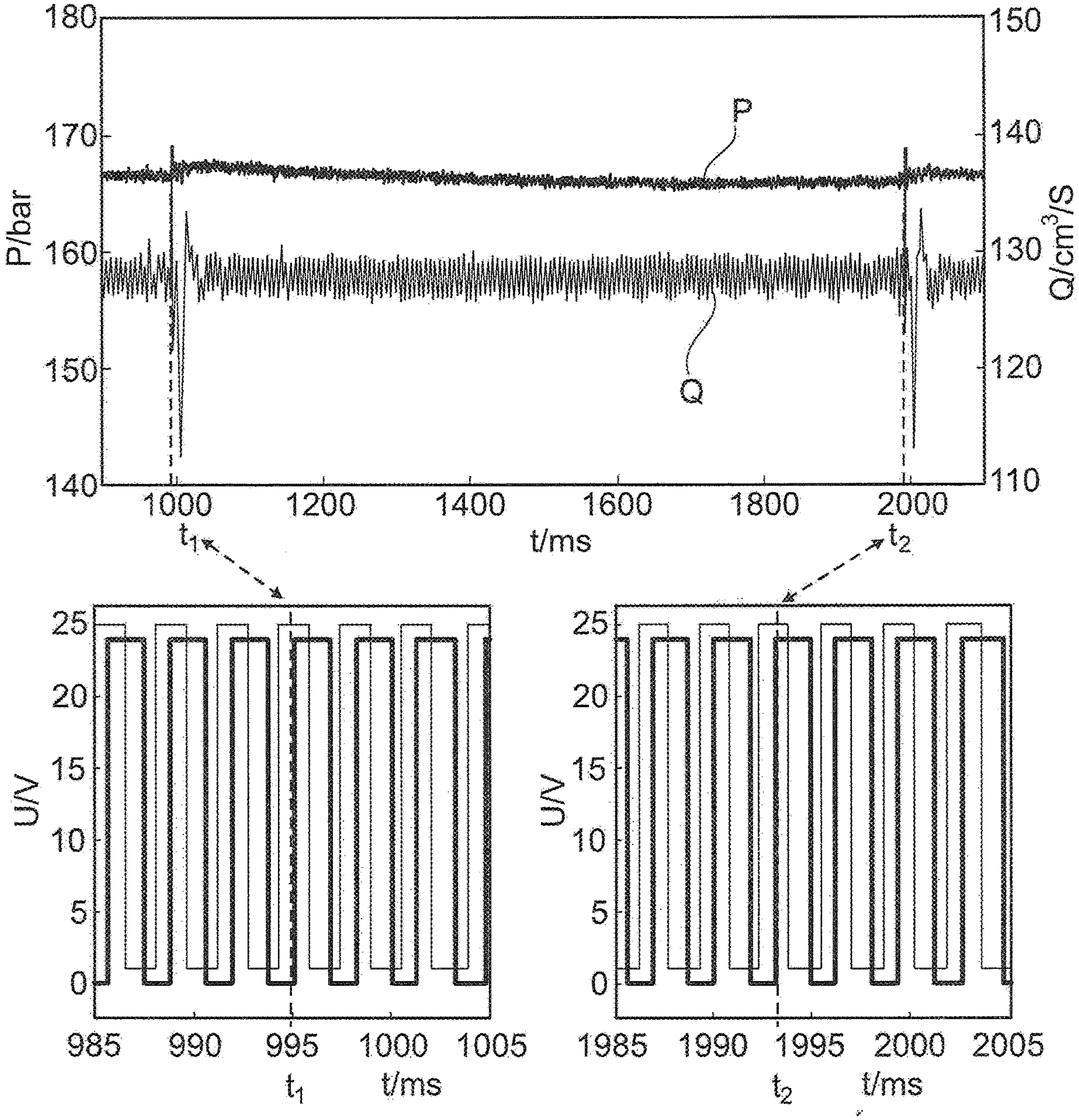

To counteract this problem, the procedure as illustrated in FIGS. 4 and 5 is suggested. First of all, it should be noted that two sensors 21 and 22 spaced apart in the circumferential direction are arranged on one of the gear wheels 19 (see FIG. 3) in the volume flow meters 14, 15, which can detect the position of the tooth flanks. The circumferential spacing of the two sensors 21, 22 preferably corresponds to half the distance between two consecutive teeth of the gear wheel 19. However, other spacings can also be provided (e.g. for 13 teeth on the gear wheels, 2.5 times the distance between two consecutive teeth, which then leads to an angular offset of the two sensors of 2.5×360°/13=69.2°).

The signal of the two sensors 21, 22 is applied as a voltage signal over time in FIG. 4 (whereby, for the sake of clarity, the two recorded functions are shown in the ordinate direction somewhat offset). It can be seen that, depending on the position of a tooth of gear wheel 19 in housing 16, there is a rectangular shape of the voltage signal from which it can be concluded when the tooth flank passes the respective sensors 21, 22. Thus, by evaluating the voltage curve in the machine control 11, it can be determined when a tooth flank enters the sensor's range due to the rising edge of the curve or leaves the area of the sensor again as a result of the descending flank; this occurs (due to the spacing of the sensors 21, 22 in the circumferential direction) out of phase for the two sensors 21, 22, the signals of which are detected on separate channels. From this, the machine control 11 can also detect when the functions repeat periodically, in order to detect the time intervals □T1, □T2, □T3 and □T4 (see FIG. 4) that are needed for the next tooth to reach the same position (for all start and end times of the signals, "time stamps" can be recorded for all the start and end times of the signals, so that they can be matched up later with the "time stamps" for the exact start and end of the shot). From this, the partial volume flows q1, q2, q3 and q4 that were delivered in the respective time intervals can then be determined. By accurately logging the times and evaluating the curve according to FIG. 4, the machine control 11 can thus also track the partial volume flows that are conveyed during the time when the gear wheel 19 has turned one single tooth further, with a relatively high resolution.

Thus, each flank is detected as shown in FIG. 4, provided with an absolute timestamp and stored with the corresponding flank type. As soon as a flank type is detected for the second time, the time difference between the current and the previous timestamp of the same flank type is calculated. By only calculating the difference between the time stamps of the same flank type, the manufacturing dispersion of the gear wheel meter with regard to the duty cycle and phase shift of the measuring channels does not affect the measured volume flow. Nevertheless, a four times higher temporal resolution is achieved than if only a single flank type is measured and evaluated. By measuring the time difference between two flanks of the same type, the instantaneous volume flow is calculated with the help of the tooth volume specified in the data sheet of the gear wheel meter by dividing the tooth volume by the time duration. By evaluating the sequence of the different flank types, a change in the flow direction is detected, so that positive and negative volume flows can be measured. During calibration, the positive flow direction is automatically detected, making it independent of the installation position of the gear meter.

FIG. 5 illustrates how the time at which the actual shooting starts t and the time at which the actual shooting ends $t_2$ are assigned to the signals detected by sensors 21, 22 via the corresponding "time stamps" recorded, in order to then determine the total volume delivered between $t_1$ and $t_2$ by adding up the individual partial volumes.

Figure 6:
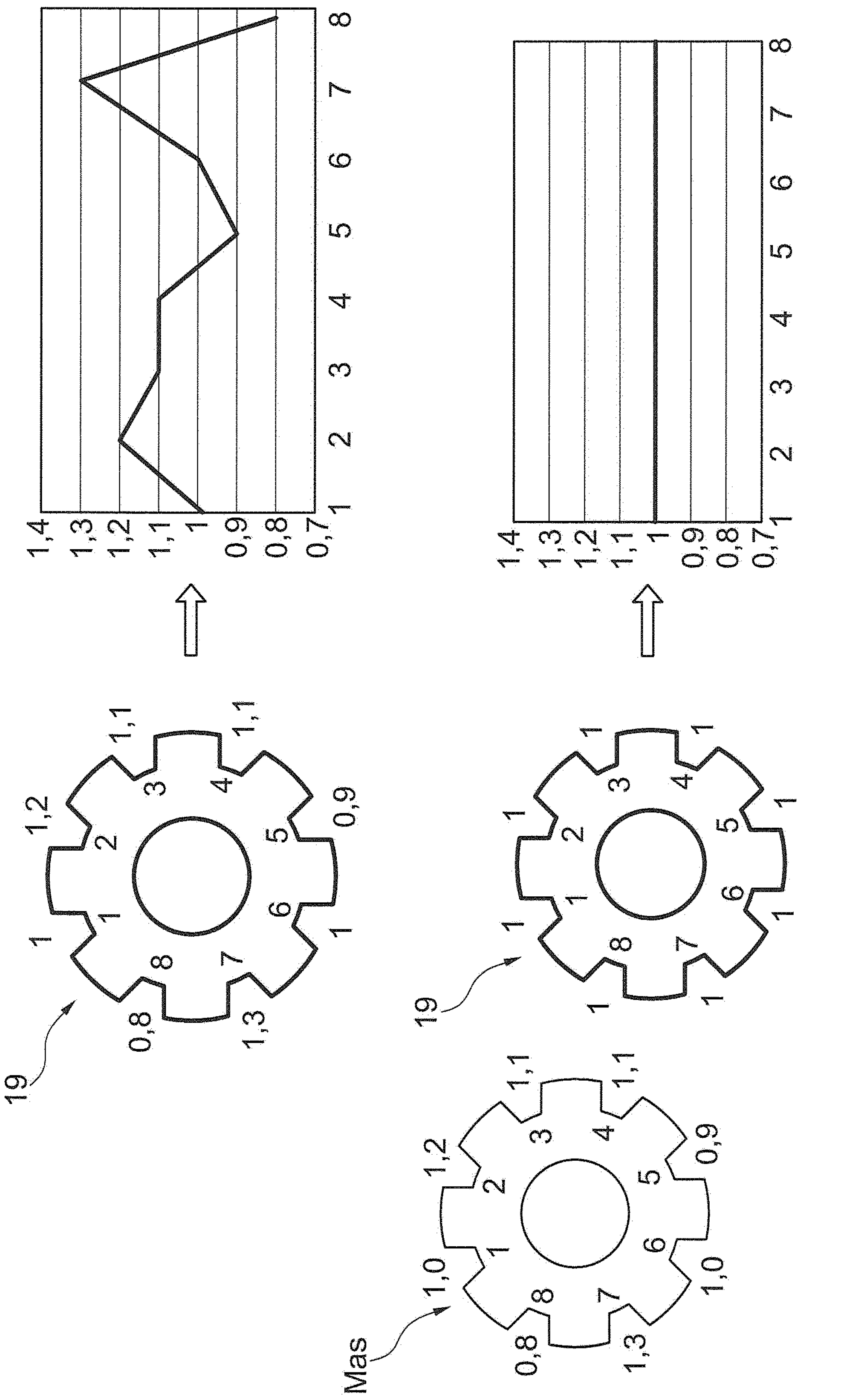

The problem of inaccuracies of the gear wheels 19, 20 in the volume flow meters 14, 15 can be counteracted with a procedure as illustrated in FIG. 6.

In the centre of the figure, the gear wheel 19 is shown schematically, which for the purpose of easier explanation is provided here with eight teeth and accordingly with eight tooth gaps. As explained, a certain chamber volume $V_K$ (see FIG. 3) is conveyed per tooth gap by the interaction with the corresponding (not shown) gear wheel 20. However, due to manufacturing inaccuracies, the actual volume conveyed fluctuates from tooth space to tooth space. By precisely determining the position of the gear wheel (as shown in FIGS. 3 and 4 and explained above), it is possible to assign a percentage value to each individual tooth space 1 to 8 of the gear wheel 19, which provides information on how high the individual chamber volume of the tooth space in question is in relation to an average value across all tooth spaces. In the example shown in FIG. 6, no deviation from the average value was found for tooth space 1 of gear wheel 19 (see number "1" for tooth space 1), while in tooth space 2 a value 20% higher than the average value was measured (see number "1.2" for tooth space 2); for tooth space 3, the value increased by 10% compared to the average value (see figure "1.1" at tooth space 3), etc. These correction values are shown in the graph to the right of the gear wheel shown above in FIG. 6 and are stored in the machine control unit in this way.

From this, an error screen Mas is calculated, as shown in the bottom left of FIG. 6. It can be seen that for the respective tooth spaces 1 to 8, the values with which the measured values are corrected during operation of the volume flow meter are determined here in order to obtain the actual values, i.e. the values of the individual tooth spaces are divided by the corresponding values of the error screen. Accordingly, for example, a correction value of "1.0" is specified for tooth space 1 (because no deviation from the average value was found for this tooth gap), while a correction value of "1.2" is stored for tooth gap 2 to reduce the increased volume for this tooth gap (dividing the determined value of 1.2 for the tooth gap by the corresponding value of the error screen gives exactly the value 1, etc.

Taking into account the error screen Mas when operating the volume flow meter then leads—as schematically illustrated for the gear wheel 19 in the centre of the FIG. 6, below, and to the right of it—to the correct value of the delivery volume being taken into account for each tooth space, which eliminates the existing errors.

This means that pitch errors in the gears, geometric inaccuracies of the tooth flanks and other possible faults can be eliminated, since the signals detected indicate a characteristic deviation from the actual physical value, which is repeated with each revolution of the gear.

In general, the cyclic measurement error can be minimised by averaging signals over entire gear revolutions, thus bringing the measured value closer to the actual physical value, which already provides an advantage in terms of measurement accuracy, but has the disadvantage of significantly reduced measurement dynamics compared to the measurement of individual signals. The error screen Mas is used to obtain the advantage of higher measurement accuracy without the disadvantage of reduced measurement dynamics.

The error screen is determined fully automatically in the machine control and can be output to the user via an interface.

Each new measured signal is now manipulated or corrected by division with the values of the error screen in such a way that the known characteristic deviation of this signal is compensated. The described correction of the signals results in a significantly less noisy volume flow signal and thus improves all subsequent processes that depend on the volume flow measurement, such as control of the volume or mass flow or the measurement of dosed volumes or masses.

In addition, the chronological sequence of the error screen makes a possible change in the gear wheel meter visible due to wear or other causes and can be used as an indication of the need to replace the gear wheel meter. Thus, the error screen offers an opportunity to carry out condition monitoring on the gear wheel meter.

This makes it possible to perform highly dynamic measurements of the instantaneous volume flows of a metering machine using commercially available gear meters, which can be implemented cost-effectively. Measurement noise can be reduced by the explained automatic detection and compensation of cyclic signal errors and geometric inaccuracies of the gear meters. This allows the instantaneous mixing ratios to be determined as accurately as possible, first in volume fractions and then in mass fractions by multiplication with the density.

The current values for the density can be calculated in the machine control as a function of the measured pressure (in particular the average pressure during the dosing process) and the measured temperature, for which purpose comparative density curves are available that have been recorded for various temperatures and pressures for the respective reaction component. At a specific pressure and temperature, the current density can thus be determined by interpolation between curves. The method of multiple linear regression can also be used for this. This method makes it possible to calculate the density at a measured pressure and temperature after recording a sufficient number of measured value triples for density, pressure and temperature.

If the suggested procedure determines that specified volumes or masses are not present or some other typical behaviour occurs at the mixing head, the production process can be terminated early to reduce scrap.

The data measured during the production process can be output as documentation to prove that the manufacturing process has run properly.

The technical evaluation of the signals, in particular the pressure curve over time, can be carried out expertly and is feasible without major problems.

For the present application, it has proved particularly useful to base the search for the above-mentioned "peak" at the start and end of the shot on a statistical evaluation of the recorded pressure data. In this case, the recorded individual values for the pressure are subjected to a statistical analysis and the standard deviation is determined for the measured values, if necessary for respectively defined time windows. To recognise an actual increase in the pressure signal, the exceeding of a number of standard deviations can then be used as a basis. Accordingly, a moving standard deviation of the pressure is continuously calculated, which represents a measure of the usual signal fluctuation. According to the Gaussian normal distribution, 99.73% of all values lie within the range of the mean+/−3 standard deviations. If a measured value exceeds the limit of the mean value plus 3 standard deviations, this is interpreted as the beginning of a pressure peak and the exact time at which it occurs is stored. Subsequently, the system searches for a maximum in the pressure signal for an adjustable period of time after the maximum and the corresponding time is also stored.

When several media are mixed in the mixing head, each medium has its own pressure signal and thus its own point in time for the start and maximum of the pressure peak. The machine control therefore preferably has the time stamps of the following synchronised events for each switching operation of the control tappet: rising or falling flanks in the shot signal, rising or falling flanks of the signal from the mixing head initiator, start of the pressure increase for each media flow, maximum of the pressure peak for each media flow.

In the machine control, this data can be prioritised and the resulting time for the start and end of the dosing process can be determined. Prioritisation is useful because the detection of the pressure peaks has a remaining statistical uncertainty, i.e. a peak may remain undetected. If at least one pressure peak has been detected, then this provides the most accurate time for the corresponding event. Likewise, it is possible to operate the mixing head with no or a defective proximity switch (mixing head initiator), so this signal may also fail to occur.

If the mixing head initiator signal is present, the time determined for the event is less accurate than that of the "peak", but more accurate than that of the shot signal. Only the shot signal is absolutely reliable, as this is required to actuate the valve, however, compared to the other signals, it has the greatest variance and is therefore assessed as being the least accurate. The highest priority is therefore assigned to the "peak" signal, the second highest to the signal from the mixing head initiator and the lowest to the shot signal.

The duration of the metering process, i.e. the dosing time, can be calculated and stored by calculating the difference between the time stamps of the end and start of the metering process. To do this, the signal form is saved according to the described prioritisation, which was used to determine the dosing time. To determine the shot duration, a mean value is formed from the time stamps of the "peak" finding for each of the media involved in the dosing. In this way, the start and end times, as well as the duration of a metering process, are measured reliably and with the best possible temporal resolution. The time delay between the shot signal, the signal from the mixing head initiator and the pressure peak can also be determined from these times, and conclusions can be drawn about the state of the control tappet and its control by statistical evaluation. This, in turn, can be used for condition monitoring of the control tappet and the control system.

In addition, the time stamps of the events mentioned are synchronised with the signals of the gear wheel meters, thus enabling the volumes and masses that have flowed during the metering process to be measured.

LIST OF REFERENCES

1 Reaction component (Polyol)
2 Reaction component (Isocyanat)
3 Metering pump
4 Metering pump
5 Groove-controlled mixing head
6 Component nozzle
7 Component nozzle
8 Recirculation groove
9 Recirculation groove
10 Control slide
11 Machine control
12 Hydraulic valve
13 Mixing chamber
14 Volume flow meter
15 Volume flow meter
16 Housing
17 Inlet opening
18 Outlet opening
19 Rotatably mounted body (Gear wheel)
20 Rotatably mounted body (Gear wheel)
21 Sensor
22 Sensor
23 Tool
24 Molded part
25 Pressure sensor
26 Pressure sensor
$t_1$ Time point of actual shot start
$t_2$ Time point of actual shot end
$T_1$ Time point of the signal to valve 12 at the shot start
$T_2$ Time point of response of the mixing head initiator
$T_3$ Time point of the signal to valve 12 at the shot end
$T_4$ Time point of the end of the signal from the mixing head initiator
Max Maximum of the pressure peak at the shot start
Mas Error screen
Q Volume flow
p Pressure
$V_K$ Chamber volume of a pair of teeth

The invention claimed is:

1. A method for the production of polyurethane components by a shot method, in which at least two reaction components are conveyed into a groove-controlled mixing head by means of metering pumps, wherein the reaction components are first conveyed in circulation through a respective component nozzle via a recirculation groove in a control slide in circulation back into a storage container, wherein a shot start is initiated by an electrical signal emitted by a machine control, as a result of which a hydraulic valve is switched and the control slide then moves from a circulation position into a shot position, so that the reaction components are entered into a mixing chamber, where they are mixed together and then discharged, wherein a shot end is then initiated by removing the electrical signal issued by the machine control, as a result of which the hydraulic valve is switched again and the control slide then moves from the shot position back into the circulation position, so that the reaction components are conveyed back again into the storage container via the recirculation groove in the control slide in circulation, wherein media flows are briefly interrupted by the mixing head while the metering pumps are running when the control slide is moved from the circulation position to the shot position and vice versa, wherein a conveyed volume flows between the metering pumps and the mixing head are each conveyed through a volume flow meter, which consists of at least one housing with an inlet opening and an outlet opening and at least two rotatably mounted bodies co-operating in the at least one housing, wherein the at least two rotatably mounted bodies are set in rotation in response to a volume flow conveyed by the volume flow meter, wherein the method comprises the steps of:

a) Determining an actual shot start by analyzing the course of a respective pressure of a reaction component after the electrical signal for the shot start has been generated and determining the time point at which the reaction component enters the mixing chamber of the mixing head and storing a time point of the actual shot start, b) Determining an actual shot end by analyzing the course of a respective pressure of a reaction component after the electrical signal for the shot end has been generated and determining a time point at which the reaction component no longer enters the mixing chamber of the mixing head and storing the time point of the actual shot end, c) Determining of a delivered volume of the at least two reaction components by means of the volume flow meter of the respective reaction components, which was delivered by the metering pumps in the period between the time point of the actual shot start and the time point of the actual shot end and outputting the respectively determined volumes.

2. The method according to claim 1, wherein, when steps a) and b) are carried out, a variation in time of the pressure of the respective reaction component is analyzed, wherein a maximum value of the pressure and/or a predetermined limit value for a pressure change over time being considered.

3. The method according to claim 2, wherein, when carrying out step a), the maximum of an occurring pressure peak is determined for the purpose of determining the shot start and the time point of occurrence of the pressure peak is determined as the time of the actual shot start.

4. The method according to claim 2, wherein, when carrying out step b), the increase in a pressure curve is determined for the purpose of determining the shot end and the time immediately before the increase in pressure is determined as the time of the actual shot end.

5. The method according to claim 1, wherein data for a density of the at least two reaction components as a function of the pressure and of the temperature of the reaction component are stored in the machine control, wherein the pressure of the at least two reaction components between the time point of the shot start and the time point of the shot end, and the temperature of the at least two reaction components being measured and an actual density of the at least two reaction components being determined therefrom.

6. The method according to claim 5, wherein a conveyed mass of the at least two reaction components is determined from the volumes of the at least two reaction components determined in step c) and the determined actual densities of the at least two reaction components.

7. The method according to claim 1, wherein the following procedure is used to determine the conveyed volume according to step c):

A) Calibration of the volume flow meter and define an error screen by:

A1): Determining of the conveyed volume for each co-operating pair of teeth of the rotatably mounted bodies;

A2): Forming an average value of the conveyed volume over all pairs of teeth;

A3): Determining of a deviation of the conveyed volume of each pair of teeth from the average value and storing the determined deviations;

B) In determining the volume conveyed during the time point of the actual shot start and the time point of the actual shot end according to step c):

B1): Determination of the conveyed volume for all partial volumes of the tooth pairs used during the start and end of the shot, taking into account the deviations from the average value using the error screen;

B2): Summation of all partial volumes to obtain a total volume delivered between the start and end of the shot.

8. The method according to claim 7, wherein two sensors are used for the determination according to step A1), which sensors detect a position of the tooth flanks or tooth heads of the rotatably mounted bodies and convert each into a square-wave signal, wherein the square-wave signal being used to detect the position of successive teeth of the rotatably mounted bodies.

9. The method according to claim 8, wherein the two sensors are arranged offset relative to one another in such a way that the position of the successive tooth flanks or tooth heads of the rotatably mounted bodies can be detected phase-shifted.

10. The method according to claim 7, wherein a calibration and setting of the error screen according to step A) is repeated periodically.

* * * * *